Patented Jan. 2, 1934

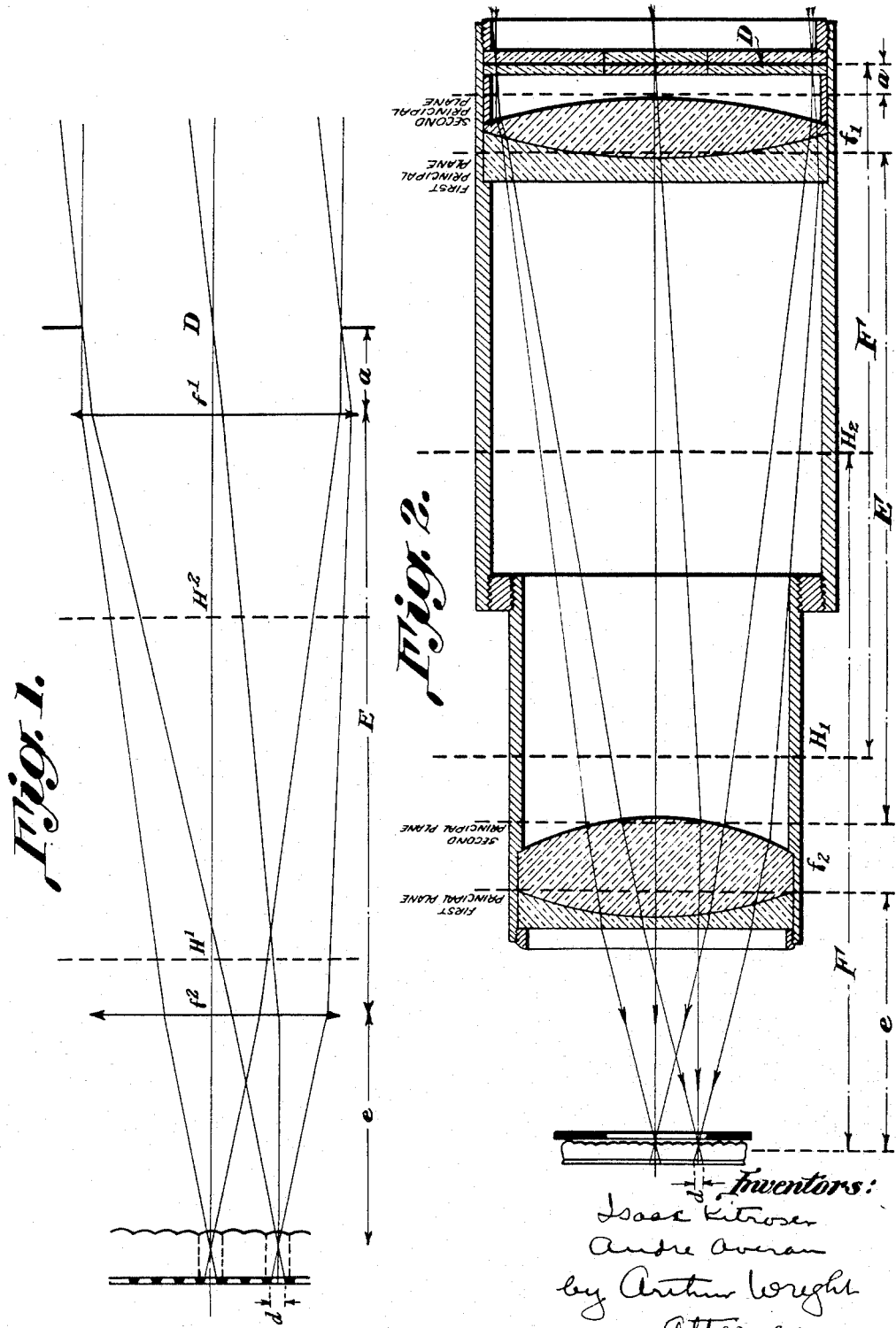

UNITED STATES PATENT OFFICE 1,941,696

PHOTOGRAPHIC OBJECTIVE

Isaac Kitroser and André Avéran, Paris, France, assignors, by mesne assignments, to Keller-Dorian Colorfilm Corporation, New York, N. Y., a corporation of Delaware Application March 18, 1929, Serial No. 348,090, and in France March 21, 1928

4 Claims. (Cl. 88—16.4)

The object of the invention is an objective device particularly adapted for taking views and the projection of films having a goffered support.

The effective diaphragm of this objective coincides with the outlet pupil and is to be found in front of the objective at a short distance from the first optical part. Its angular opening corresponds to that of the luminous beam sent by each microscopic lens of the goffered film from the image behind the same. The selector filter of the colors coincides in position with this diaphragm when seen from the side of the film and the filter is located by the optical system at the same distance optically for the projection as for the taking of views.

Thus arranged the filter can be easily aerated, cooled and displaced or put in place. We can therefore pass easily from the operation on colors to the operation on black and white.

The screen being in front is disposed at an optical distance which is larger than if it were on the inside of the objective. Consequently the collimator lens must be less powerful and give less Pezwal curvature. The lenses being adapted to a large opening with the diaphragm, the objective does not possess the "cat's eye" (oval appearance) defect, that is to say, diminished light in oval marginal areas.

The accompanying drawing illustrates an objective composed of two optical systems at respective focal distances $f_1$ and $f_2$.

In which Fig. 1 is a diagrammatic view of the course of the rays in an apparatus made in accordance with our invention; and Fig. 2 is a representation of an apparatus made in accordance with our invention.

This objective is illustrated on the figure by principal planes $H_1$ and $H_2$ and its diaphragm of a diameter D is placed at the distance $a$ from the first optical part.

If the total focus of the objective is F and the spacing of the two optical systems E, its object focus is to be found at the distance $e$ from the second optical system. The following equations fix this data of construction in elementary dioptric both for the taking and the projection objectives and optical characteristics of which are the same, and First
$$\frac{1}{f_1}+\frac{1}{f_2}-\frac{E}{f_1 f_2}=\frac{1}{F}$$

Second
$$\frac{1}{e}=\frac{1}{f_1-E}+\frac{1}{f_2}$$

Third
$$T=e+\frac{f_2\left(\frac{f_1 a}{a-f_1}+E\right)}{\frac{f_1 a}{a-f_1}+E-f_2}$$

Fourth
$$D=FK$$
or
$$K=\frac{D}{F}$$

K is the ratio of the inlet pupil D to F the focus of the projection objective which must be the same as in the view taking camera objective for example $$K=\frac{d}{f}$$

where $d$ is the diaphragm opening in the camera and $f$ the focus of the camera lens;

T is the optical distance of the diaphragm or selector filter of colors to the film in the projection objective which must be the same as in the view taking camera apparatus.

The value of F when calculating for the projecting objective is fixed by the condition of projection in a given room that is to say the total focus is chosen so that the image will be the desired size on the screen;

The value of D that is to say the diaphragm opening is fixed by Equation four.

$e$ and $a$ are derived from the character of construction of the apparatus and the objectives. That is to say for example $e$ is made wide enough for the door provided for inserting the film in the projector to swing outwardly to the extent of the width of the door, and $a$ is made wide enough to allow the insertion and removal of the color screen.

There remain therefore three equations, the first three having three unknowns $f_1$, $f_2$ and E for determining the projection lenses for example and from which they can be determined accordingly. Unless these equations are followed for the lenses a sharp projection and good colors cannot be obtained with the diaphragm in front of the objective.

In a particular case, for example, in a projection objective these equations give the following values where F, $a$ and $e$ are already obtained as above, $f_1$, $f_2$, and E being derived from the three equations mentioned, as above referred to:

F—200 mm.
$f_1$—300 mm.
$f_2$—220 mm.
E—190 mm.
$a$—27.27 mm.
$e$—73.33 mm.

This example corresponds to the case where the operations are brought about with a picture taken on a film with a collimating lens and view taking objective open at $$\frac{f}{2.5}$$

and where $D=80$ mm., where the $$2.5=\frac{f}{d}$$

Having described our invention what I claim as new and desire to secure by Letters Patent is:

1. A collimated objective adapted to be used with goffered films adapted to produce sharp images and good color reproductions comprising an optical system and an effective diaphragm color selector filter which is placed in front of the objective and in which the optical system conforms to the formulæ

First
$$\frac{1}{f_1}+\frac{1}{f_2}-\frac{E}{f_1 f_2}=\frac{1}{F}$$

Second
$$\frac{1}{e}=\frac{1}{f_1-E}+\frac{1}{f_2}$$

Third
$$T=e+\frac{f_2\left(\frac{f_1 a}{a-f_1}+E\right)}{\frac{f_1 a}{a-f_1}+E-f_2}$$

where $f_1$ and $f_2$ are the focal distances of the first and second optical systems respectively, E the spacing between the two optical systems, F the total focus of the objective, $e$ the object focus from the second optical system, $a$ the distance of the filter diaphragm from the first optical system, and T the distance of the filter-diaphragm from the film in the camera apparatus used.

2. An objective adapted to be used with goffered films adapted to produce sharp images and good color reproductions comprising an optical system and a collimating lens and an effective diaphragm color selector filter which is placed in front of the objective, and in which the optical system conforms to the formulæ

First
$$\frac{1}{f_1}+\frac{1}{f_2}-\frac{E}{f_1 f_2}=\frac{1}{F}$$

Second
$$\frac{1}{e}=\frac{1}{f_1-E}+\frac{1}{f_2}$$

Third
$$T=e+\frac{f_2\left(\frac{f_1 a}{a-f_1}+E\right)}{\frac{f_1 a}{a-f_1}+E-f_2}$$

where $f_1$ and $f_2$ are the focal distances of the first and second optical systems respectively, E the spacing between the two optical systems, F the total focus of the objective, $e$ the object focus from the second optical system, $a$ the distance of the filter diaphragm from the first optical system, and T the distance of the filter-diaphragm from the film in the camera apparatus used.

3. A collimated objective adapted to be used with goffered films adapted to produce sharp images and good color reproductions comprising an optical system and an effective diaphragm color selector filter which is placed in front of the objective and in which the optical system conforms to the formulæ

First
$$\frac{1}{f_1}+\frac{1}{f_2}-\frac{E}{f_1 f_2}=\frac{1}{F}$$

Second
$$\frac{1}{e}=\frac{1}{f_1-E}+\frac{1}{f_2}$$

Third
$$T=e+\frac{f_2\left(\frac{f_1 a}{a-f_1}+E\right)}{\frac{f_1 a}{a-f_1}+E-f_2}$$

where $f_1$ and $f_2$ are the focal distances of the first and second optical systems respectively, E the spacing between the two optical systems, F the total focus of the objective, $e$ the object focus from the second optical system, $a$ the distance of the filter diaphragm from the first optical system, and T the distance of the filter-diaphragm from the film in the camera apparatus used, and where the diaphragm of the projecting apparatus $D=FK$, in which $$K=\frac{d}{f},$$

in which $d$ is the diaphragm opening of the camera apparatus and $f$ the focus of the camera apparatus.

4. An objective adapted to be used with goffered films adapted to produce sharp images and good color reproductions comprising an optical system and a collimating lens and an effective diaphragm color selector filter which is placed in front of the objective, and in which the optical system conforms to the formulæ

First
$$\frac{1}{f_1}+\frac{1}{f_2}-\frac{E}{f_1 f_2}=\frac{1}{F}$$

Second
$$\frac{1}{e}=\frac{1}{f_1-E}+\frac{1}{f_2}$$

Third
$$T=e+\frac{f_2\left(\frac{f_1 a}{a-f_1}+E\right)}{\frac{f_1 a}{a-f_1}+E-f_2}$$

where $f_1$ and $f_2$ are the focal distances of the first and second optical systems respectively, E the spacing between the two optical systems, F the total focus of the objective, $e$ the object focus from the second optical system, $a$ the distance of the filter diaphragm from the first optical system, and T the distance of the filter-diaphragm from the film in the camera apparatus used and where the diaphragm of the projecting apparatus $D=FK$, in which $$K=\frac{d}{f},$$

in which $d$ is the diaphragm opening of the camera apparatus and $f$ the focus of the camera apparatus.

ISAAC F. KITROSER.
ANDRÉ AVÉRAN.